Figure 1:
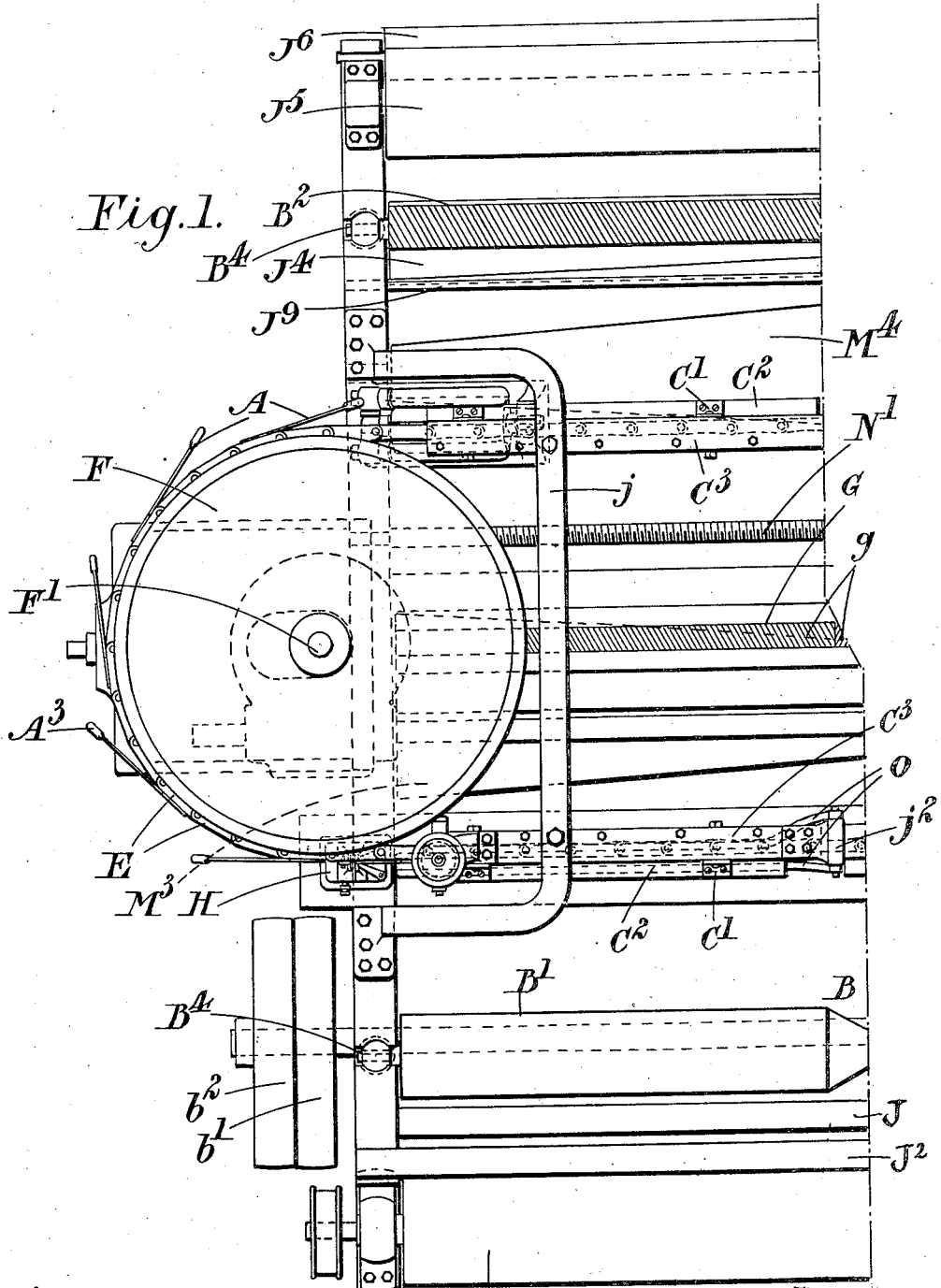

No. 893,474. PATENTED JULY 14, 1908.
C. W. FULTON.
MACHINE FOR CUTTING FLOAT THREADS ON FANCY SPOT FABRICS.
APPLICATION FILED OCT. 21, 1905.
6 SHEETS—SHEET 1.

Witnesses:
Thomas Durant
Durant Church

Inventor:
Charles W. Fulton,
By Church & Church
His Attys

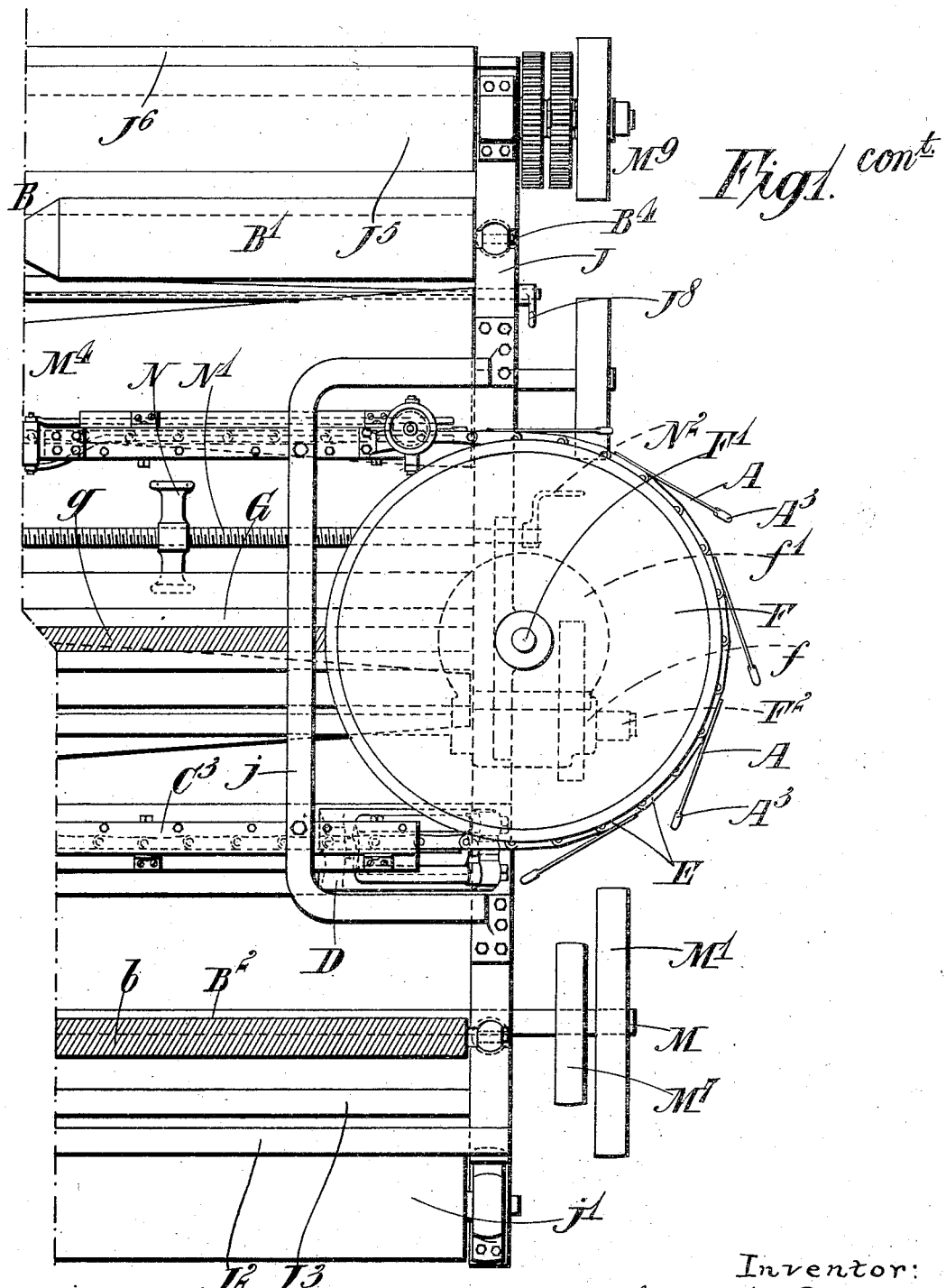

No. 893,474.
PATENTED JULY 14, 1908.
C. W. FULTON.
MACHINE FOR CUTTING FLOAT THREADS ON FANCY SPOT FABRICS.
APPLICATION FILED OCT. 21, 1905.
6 SHEETS—SHEET 3.
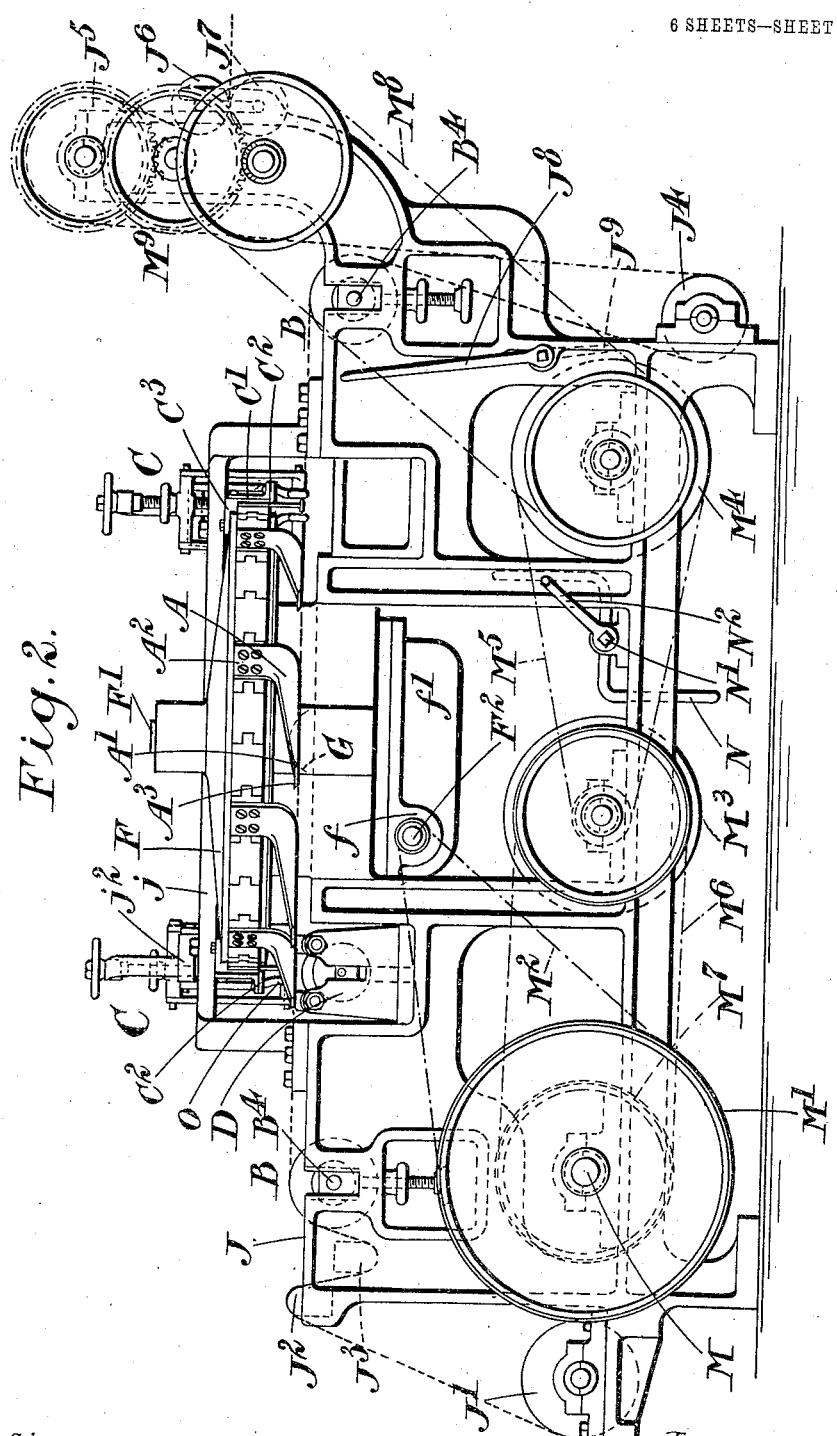
Witnesses:
Thomas Durant
Durant Church
Inventor:
Charles W. Fulton
by Church & Church
his Attys No. 893,474.
PATENTED JULY 14, 1908.
C. W. FULTON.
MACHINE FOR CUTTING FLOAT THREADS ON FANCY SPOT FABRICS.
APPLICATION FILED OCT. 21, 1905.
6 SHEETS—SHEET 4.
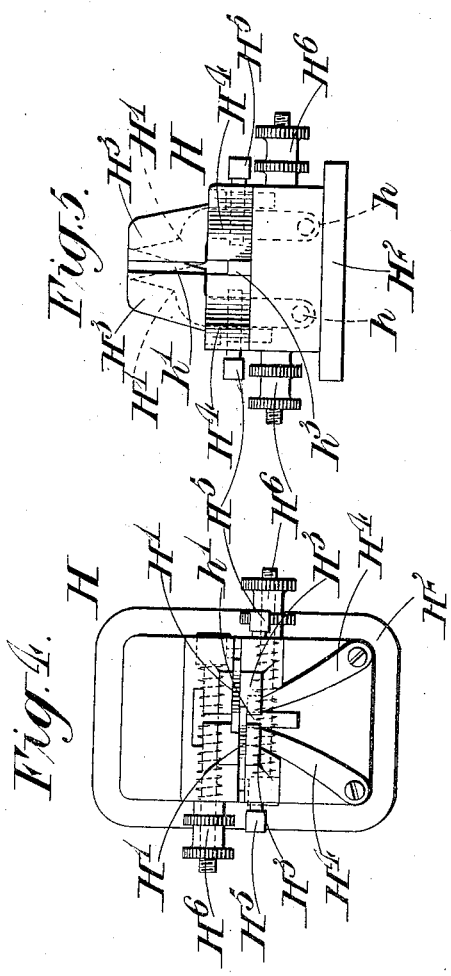
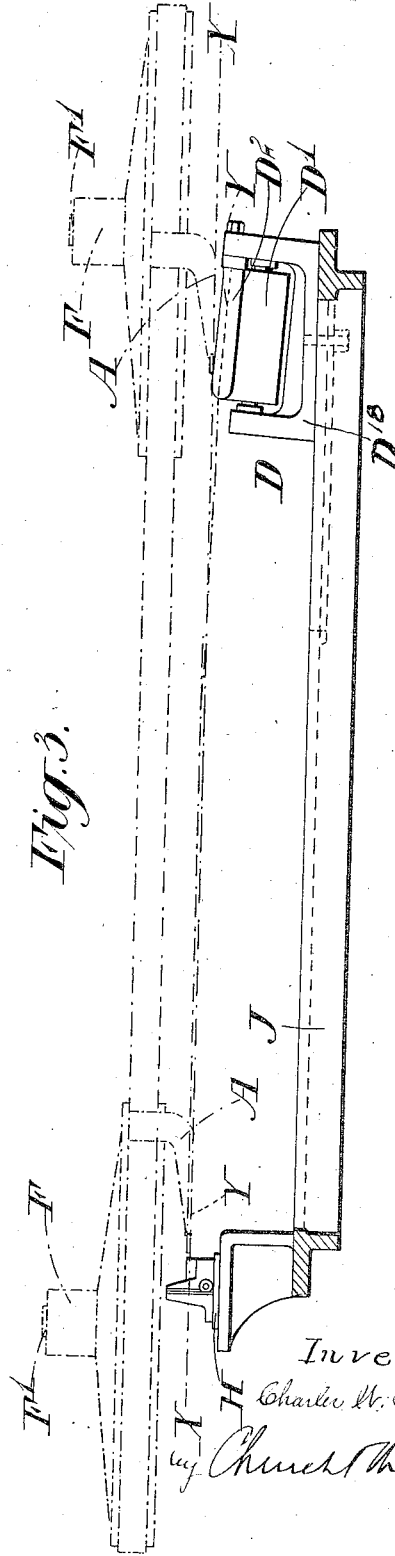
Witnesses:
Thomas Durant
Durant Church
Inventor:
Charles W. Fulton
by Church Church
his Attys

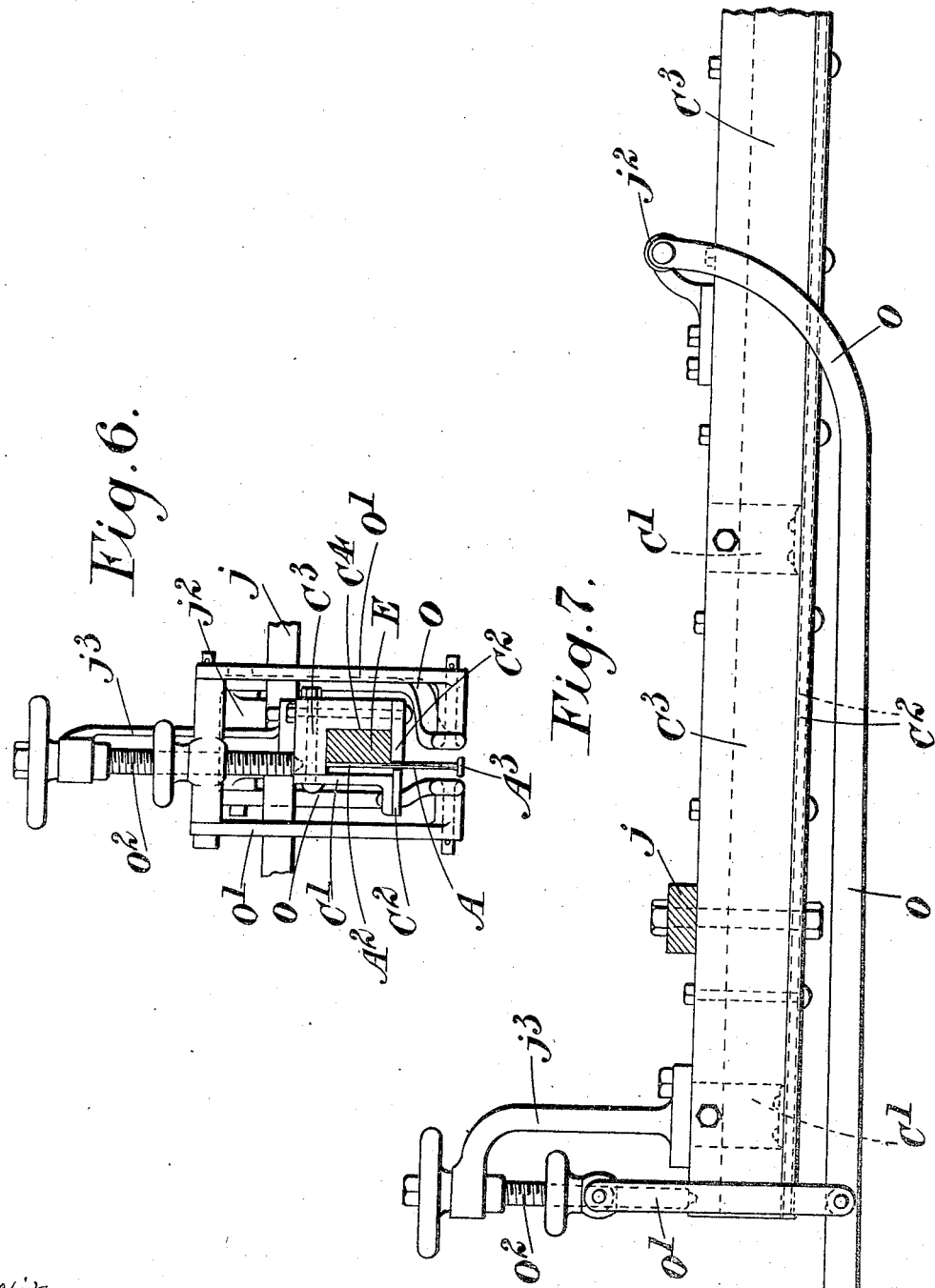

No. 893,474.

PATENTED JULY 14, 1908.

C. W. FULTON.
MACHINE FOR CUTTING FLOAT THREADS ON FANCY SPOT FABRICS.
APPLICATION FILED OCT. 21, 1905.

6 SHEETS—SHEET 6.

Witnesses:
Thomas Durant.

Inventor:
Charles W. Fulton,
by Church & Church
his Attys

UNITED STATES PATENT OFFICE.

CHARLES WM. FULTON, OF PAISLEY, SCOTLAND.

MACHINE FOR CUTTING FLOAT-THREADS ON FANCY SPOT FABRICS.

No. 893,474.　　　　Specification of Letters Patent.　　　Patented July 14, 1908.

Application filed October 21, 1905. Serial No. 283,846.

*To all whom it may concern:*

Be it known that I, CHARLES WILLIAM FULTON, a subject of the King of Great Britain, residing at Paisley, in Scotland, have invented certain new and useful Improvements in or Relating to Machines for Cutting Float - Threads on Fancy Spot Fabrics, of which the following is a specification.

This invention relates to apparatus or machines for cutting float threads on fancy spot fabrics. In these fabrics threads which form the spots or pattern when not in use are continued along or "floated" over until again brought into action to form a subsequent spot or the like as the weaving proceeds.

It is the chief object of the present invention to provide a machine for removing the "floated" or superfluous portions or loops of the spot threads, that is to say, the parts of these threads which are not actually used in the formation of spots or patterns.

According to this invention, as the fabric is passed through the machine, the loops of the spot threads are cut open by one or more series of continuously moving cutters or blades.

The cutters for ripping or cutting the loops of the spot threads consist preferably of a series of knives or blades connected to or carried by a continuously moving chain or band by which the blades are moved across the fabric as it passes through the machine. The ripping blades are so shaped and the fabric is presented to them in such a manner that the point of the blade passes between the loop and the body of the fabric, and severs the threads preferably close to a spot. The band carrying the ripping blades is endless and is mounted on two drums or around two sprocket wheels mounted on vertical shafts or spindles arranged at opposite sides of the machine and one or both of which may be driven by appropriate gear.

The machine is essentially a high speed machine and therefore cheapens the cost of production.

The ripping blades or knives may be otherwise arranged and mounted, but the above arrangement is preferable, as the blades in passing across the fabric in one direction may be adapted to rip only some of the loops, the remaining loops being ripped by the blades moving across the fabric in the opposite direction.

Nipping devices, preferably rollers, are provided by which the fabric is thus kept taut and prevented from sagging during its passage through the machine.

The line of travel of the ripping blades viewed in plan may be at a right angle or at any other appropriate angle to the line of travel of the fabric.

To further assist in the prevention of the sidewise movement of the fabric caused by the knives, rollers may be employed to grip the selvage of the fabric, these rollers being mounted at the sides of the machine and roughened or grooved with or without a tensioning spring to press them together. This attachment can be so set that the edge of the fabric is caught and deflected below the line of travel of the knives. These rollers can be set at an angle so that they tend to draw the fabric passing between them towards the sides of the machine at which they are attached, the drawing tendency being opposed to that of the cutters.

Conveniently a sharpening device is provided for the ripping blades so that the tendency which might arise owing to bluntness to drag the parts of the spot threads woven in the fabric will be avoided and the necessity of stopping the machine frequently to renew or sharpen the cutters obviated.

After the loops are ripped or opened, the loose threads may be beaten up by appropriate beaters so that they stand away from the body of the material and are in a convenient position to be finally removed, which is accomplished preferably by a cropping device consisting of a series of rotating cutters which cut the threads after they have passed the beaters.

Figure 8:
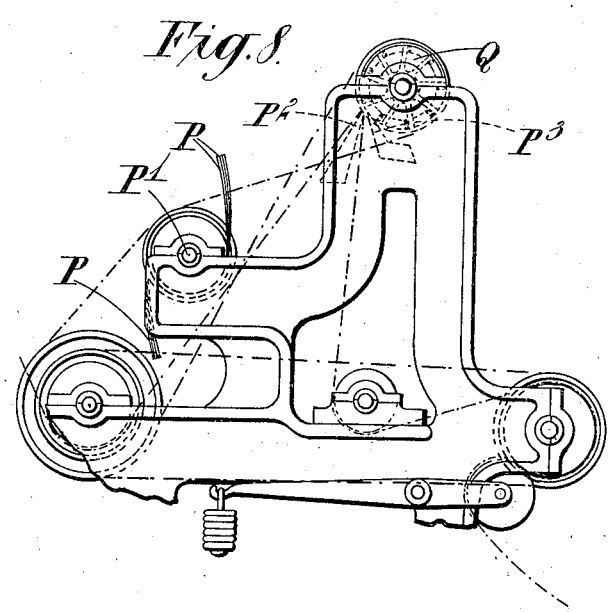

Referring to the drawings, Figure 1 is a plan, and Fig. 2 an end elevation of a preferred embodiment of the invention; Fig. 3 is a transverse view mainly diagrammatic showing the line of travel of the knives and the line of the fabric as it passes beneath the knives. Fig. 4 is a plan, and Fig. 5 an elevation of the sharpening mechanism; Figs. 6 and 7 are elevations at right angles to each other showing the knife guides, and Fig. 8 is a sectional elevation showing a preferred construction of cropping mechanism for removing the loop threads after the loops have been opened by the ripping blades.

A are the ripping blades or cutters, B the guide or bearing rollers over which the fabric travels, C are the knife guides, D the nipping devices which engage the edges or selvages of the fabric.

This machine is specially adapted for treating fabrics wherein the spots or patterns are formed in the warp threads. It has been usual to form these "spots" or patterns from the weft threads since the floated portions of the threads can then be removed by known machinery. Apart from this reason it is preferable to form the spots from the warp threads and the present invention allows of this being done and thus a better fabric and cheaper can be produced.

The cutters or ripping blades A are of triangular shape, having cutting edges $A^1$ in front which are inclined upwardly from the point of the knife to the part $A^2$ where they are connected to the continuously traveling chain E. At the points the ripping blades, which are preferably of steel, have an enlarged portion $A^3$ or button of hardened steel. These ripping blades A are attached by suitable means at convenient intervals to the links of the chain E which is mounted upon flanged drums or disks F and the links of the chain are suitably curved to lie close against the surfaces of these drums. The drums F are mounted at opposite sides of the machine upon vertical spindles $F^1$, either or both of which may be rotated, by worm gearing $f f^1$ from a shaft $F^2$ or otherwise. These drums are rotated and the blades pass across the fabric at a high rate of speed. The points of the knives enter between the float threads or loops and the body of the fabric and owing to the high rate at which the blades travel the loops are quickly cut open or ripped and the tendency which would otherwise arise for the knives to drag the threads and distort or withdraw entirely the spot or pattern from the fabric is overcome.

The fabric is presented to the cutters in such a manner that the loops on one half of it are ripped by the blades at one side of the drums and the other half by the blades at the other side, that is to say the knives in traveling across the machine from right to left engage with the loops of the fabric at or about the center line and rip from that point to the left hand selvage and the knives on traveling across the fabric in the opposite direction engage the loops from about the center of the machine and rip those between the center line and the right hand selvage. This presentation of the fabric is in the present example accomplished by the rollers B which are mounted on opposite sides of the drums F. These rollers have a cylindrical portion $B^1$ which extends from one end of the rollers to near the center and at their opposite ends they have a cylindrical portion $B^2$ of smaller diameter than the part $B^1$ and this portion extends also nearly to the mid point of the roller. At the junction of these two parts the rollers B have a quick tapered portion $B^3$. The portion $B^1$ of the roller having the larger diameter is at the side of the machine at which the cutting takes place; this portion of the roller being so disposed as to raise the fabric against the ripping blades A.

As will be seen from Fig. 3 the fabric is actually raised by the roller B or by the portion $B^1$ thereof slightly above the line of travel $x$—$x$ of the knives. The line $y$—$y$ indicates the line of the fabric which rises above the line of travel $x$—$x$ of the blades at or about midway across the machine and approximately at the point where the blades will first enter the loops. As the knives are not exactly over the roller the enlarged point of the blades presses firmly against the cloth and presses it down without danger of perforating it and this helps to raise the loop threads away from the body of the cloth so that they may be the more readily engaged by the knives. The smaller diameter portion $B^2$ of the rollers is provided with a spirally grooved surface $b$ which bites against the cloth and tends to prevent it from being drawn sidewise by the knives.

The rollers B are carried in adjustable bearings $B^4$.

The speed of the cutting blades is always adjusted relative to the feed of the fabric in accordance with the frequency of the pattern under treatment, and the threads will be cut by the blades close behind a "spot". This arrangement is preferred since should any drawing action be given to the threads by the blades the likelihood of the "spot" itself being withdrawn from the fabric is avoided. In order to permit the ripping taking place at the desired point, the speed of travel of the ripping blades relatively to the speed of travel of the fabric is such that the blades enter the loop and on account of their high speed effect a quick drawing cut while the fabric has only moved forward a very short distance.

Between the two rollers B there extends across the machine a straight bar G over which the fabric passes and this bar is conveniently provided with a roughened surface $g$.

It is essential that the cutting edges of the blades are maintained sharp and this is accomplished without disconnecting the blades from the chain or interfering with the operation of the machine by one or more sharpening devices H which are mounted on the side frame J of the machine in such a position that the knives pass through them and are kept constantly sharpened. This sharpening device is shown separately in Figs. 4 and 5 and comprises two sharpening hones or arms $H^1$ pivoted at $h$ to the base $H^2$. The upper ends of these hones having the sharpening surfaces proper overlap as shown in Fig. 5, and the device is provided at the portion where the blades actually pass with stationary guides H³, the space $h^1$ between which is just sufficiently wide to allow for the passage of the blade.

To prevent undue wear coming upon the knives before engagement with the sharpening surfaces and to insure that the sharpening will be effected close down to the point of the blade owing to the edge being brought exactly under the point of crossing of the two hones $H^1$, pivoted guide arms $H^4$ are provided and are so arranged that they are engaged by the button on the point of the knives before the cutting edge of the knife is engaged by the sharpening portions.

The arms $H^4$ are conveniently made of softer material than the enlargements $A^3$ on the blades so that the wear will mostly be taken by these guiding arms which when worn can be readily readjusted, and the projection $h^3$ on the base $H^2$ acts as a stop for the arms $H^4$ to regulate their position by adjusting the screws $H^5$.

$H^6$ are screws for adjusting the springs controlling the hones $H^1$.

The fabric is fed from a roller $J^1$ and passes upward over a guide $J^2$ and then under a guide $J^3$ from which it is led over the roller B at the front of the machine. From the roller B the fabric passes beneath the ripping blades and over the central bar G which extends across the machine. It then passes under the blades on their return journey and over the second roller B at the rear of the machine. After passing over this second roller the fabric is led downward and round a roller $J^4$ from which it again passes upward over a roller $J^5$ and between rollers $J^6$ and $J^7$.

$J^8$ is a pivoted hand lever carrying at its lower end a curved bar $J^9$ which can be caused to bear to a greater or less degree against the fabric and take up any slack that may exist in the center.

The roller $J^5$ which is provided with a gripping surface is driven and acts to draw the fabric through the machine. This roller may be driven independently of the drums F which impart motion to the blades but preferably both driving motions are taken from the same shaft M. At opposite ends of the shaft M are driving pulleys $b^1$, $b^2$, or pulleys $M^1$ by which the drive is transmitted by a chain or band $M^2$ to the shaft of the worm gearing connected with the drum spindles. The drive is also taken from this shaft M by suitable mechanism to the roller $J^5$ which draws the cloth through the machine.

In order that the machine may be used for cloths in which the spots or patterns appear with more or less frequency, it is desirable that the speed of travel of the cloth may be varied without interfering with the speed of travel of the knives. This is conveniently accomplished by a variable speed mechanism comprising conveniently two tapering rollers $M^3$ $M^4$ which are geared together by an adjustable belt $M^5$, the roller $M^3$ receiving the drive from the shaft M by belt or chain gearing $M^6$ $M^7$. The roller $M^4$ transmits the drive by a belt or chain $M^8$ to a train of spur gearing $M^9$ connected with the roller $J^6$. The belt $M^5$ is moved along the surfaces of the conical rollers to vary the speed by a belt shifter N mounted on a screw shaft $N^1$ operated by a handle $N^2$ or otherwise.

In order to prevent the chain and therefore the blades rattling or vibrating and to secure accuracy of their engagement with the threads of the loops, the blades are caused to pass between guides C. These guides comprise bars $C^2$ suspended from a bar $j^1$. One guide $C^2$ is connected to a bracket $C^3$ attached to the bar $j^1$, and the other is secured to a hanger $C^1$ attached to the bracket $C^3$. The space between the guides $C^2$ is just sufficient to allow the blades to pass and the part $C^3$ has a groove $C^4$ to receive and steady the chain.

A convenient form of nipping devices D for holding the cloth against the pull of the ripping blades comprises a roller $D^1$ set at an angle which may be varied by means of an adjustable bearing $D^{18}$, Fig. 2, in order to vary the tension and inclination of the fabric, in accordance with its thickness and two rollers $D^2$ of smaller diameter which are mounted above the roller $D^1$. These devices are mounted preferably below the knives and at the side of the machine opposite to that at which the cutting takes place. The fabric is led over the top of the larger roller $D^1$ and is pressed down against it by the rollers $D^2$. The rollers are rotated by the cloth passing between them and in rotating tend to pull the cloth against the action of the knives. This device D is adjustable by means of a bolt taking into the side frame J in position to suit various widths of cloth. The effect of employing rollers will be to cause the cloth to travel obliquely when passing under the knives or to draw it against the pull of the knives. The nipping device D or widener, owing to its providing a strain against the line of travel of the knives, prevents the cloth gathering in front of the knives and so avoids the danger of the cloth being ripped or damaged.

Bearing upon the fabric to keep it flat on each side of the ripping blades and also to curtail the rise of the fabric between the succeeding blades, at the cutting positions are bars O pivoted to the cross bar $j$ of the machine frame at $j^2$ and connected by links $O^1$ to an adjustable screw $O^2$ carried by a bracket $j^3$ so that these bars can be raised or lowered into proper adjustment as desired. After passing from the ripping blades, the threads of the now opened loops can be removed entirely by cropping mechanism. This cropping mechanism may be mounted on the machine to engage the fabric between the rollers J⁴ and J⁵ or the cropping mechanism may be mounted beyond the roller J⁵. A convenient form of the cropping mechanism comprises a number of beaters P mounted on a rotating shaft P¹ and adapted to rap or beat the cloth so that the threads of the loops are raised and stand away from the body of the fabric. After passing the beaters, the fabric passes between two opposed sharp edges P² P³ above which is mounted a rotating spiral cutter Q which shears off these threads.

What I claim as my invention and desire to secure by Letters Patent is—

1. In a machine for removing loops or float threads from a woven fabric the combination of a series of continuously moving cutters traveling across the fabric an endless continuously moving support for the cutters and means for feeding the fabric forward.

2. In a machine for removing loops or float threads from a woven fabric the combination with a series of continuously moving cutters traveling across the fabric of means for conveying the fabric forward continuously and means for presenting the fabric to the cutters.

3. In a machine for removing loops or float threads from a woven fabric the combination with a series of continuously moving cutters and means for feeding the fabric forward continuously of means for presenting the fabric to the cutters, means for supporting the fabric in its passage through the machine and means for holding the selvages away from the cutters.

4. In a machine for removing loops or float threads from a woven fabric the combination with a series of continuously moving cutters traveling across the fabric, means for feeding the fabric forward continuously and means for supporting the fabric of means for presenting the fabric to the cutters and means for guiding the cutters and steadying them.

5. In a machine for removing loops or float threads from a woven fabric the combination with a series of continuously moving cutters and means for moving the fabric forward continuously, of means for varying the speed of the fabric relatively to the speed of the cutters.

6. In a machine for removing loops or float threads from a woven fabric the combination with a series of continuously moving cutter blades of inclined cutting edges for the blades, and means for feeding the fabric forward continuously.

7. In a machine for removing loops or float threads from a woven fabric the combination with a series of pointed blades, upwardly inclined cutting edges for the blades, and enlargements on the points of the blades, of means for continuously moving the cutters across the fabric and means for feeding the fabric forward continuously to the blades.

8. In a machine for removing loops or float threads from a woven fabric the combination with a series of pointed ripping blades, upwardly inclined cutting edges for the blades, and enlargements on the points of the blades, of an endless chain carrying the blades, continuously rotating drums for the chain at opposite edges of the fabric, and feed rollers for feeding the fabric forward continuously to the ripping blades.

9. In a machine for removing loops or float threads from a woven fabric the combination with a series of continuously moving cutters, and means for feeding the fabric forward to the cutters continuously, of means for presenting one portion of the fabric to the cutters when they are traveling in one direction and means for presenting the other portion of the fabric to the cutters when they are traveling in the opposite direction.

10. In a machine for removing loops or floating threads from a woven fabric, the combination with a series of continuously-circulating cutters traveling across the fabric and which act during each transverse motion across the fabric, and means supporting the fabric whereby the cutters when moving in one direction engage with the loop or floating threads on one portion only of the fabric, and during the return motion engage with the threads on the other portion of the fabric.

11. In a machine for removing loops or float threads from a woven fabric the combination with a series of continuously moving pointed blades traveling across the fabric, an endless chain carrying the blades, rotatable drums at opposite edges of the fabric for driving the chain, and means for feeding the fabric forward continuously, of a roller for presenting one half width of the fabric to the cutters when moving across the fabric in one direction, and a roller for presenting the other half width of the fabric to the cutters when traveling across the fabric in the opposite direction.

12. In a machine for removing loops or floating threads from a woven fabric, the combination with a series of continuously circulating pointed blades which when traveling across the fabric in one direction cut the floating threads on one portion of the fabric and cut the remainder of the floating threads when traveling across the fabric in another direction, the rollers having portions of different diameters of which the portion of one roller having the larger diameter presents one portion of the fabric to the cutters when moving in one direction and the larger diameter of the other roller presents the other portion of the fabric to the cutters on their return motion, a gripping or retaining surface being formed on a small diametered portion of the rollers to engage and stretch the fabric.

13. In a machine for removing loops or float threads from a woven fabric, the combination with a series of continuously moving pointed blades, upwardly inclined cutting edges for the blades, and enlargements on the points of the blades, of an endless chain carrying the blades, rotatable drums at opposite edges of the fabric for carrying the chain, a roller adjacent to the blades at one side of the drums, an enlarged portion on the roller for presenting one half width of the fabric to said cutters, a gripping surface on the other portion of the roller, a roller adjacent to the blades on the other side of the drums, an enlarged portion on one end of the roller for presenting the other half width of the fabric to the ripping blades at that side of the drums, and means for feeding the fabric forward continuously.

14. In a machine for removing loops or float threads from a woven fabric, the combination with a series of tapered blades, carried by an endless chain, enlargements on the points of the blades, upwardly inclined cutting edges for the blades, rotating drums mounted on vertical spindles at opposite edges of the fabric, a roller adjacent to the blades at one side of the drums, an enlarged portion at one end of the roller, a gripping surface on the small diameter portion of the roller, a roller adjacent to the ripping blades at the other side of the drums, an enlarged portion at one end of the roller, a gripping surface on the small diameter portion of the roller and a support for the fabric between these two rollers.

15. In a machine for removing loops or float threads from a woven fabric the combination with a series of continuously moving cutters traveling across the fabric and means for feeding the fabric forward continuously to the cutters, of presser bars at each side of the cutters for the purpose described.

16. In a machine for removing loops or float threads from a woven fabric the combination with a series of tapered blades, carried by an endless band, enlarged portions on the points of the blades, upwardly inclined cutting edges for the blades, drums mounted upon vertical spindles at opposite edges of the fabric for rotating the endless band and means for feeding the fabric forward continuously to the blades, of adjustable presser bars bearing upon the fabric at both sides of the cutters.

17. In a machine for removing loops or float threads from a woven fabric the combination with a series of tapered blades mounted upon an endless chain, and having upwardly inclined cutting edges and enlarged points, drums mounted upon vertical spindles at opposite edges of the fabric to drive the chain and means for feeding the fabric forward continuously to the blades of guide bars bearing upon the blades from opposite sides.

18. In a machine for removing loops or float threads from a woven fabric the combination with a series of tapered blades mounted upon a continuously moving endless chain, and having enlarged points and upwardly inclined cutting edges, of a sharpening device through which the blades pass successively.

19. In a machine for removing loops or float threads from a woven fabric the combination with a series of blades, an endless chain carrying the blades, drums mounted upon vertical spindles to drive the drums, upwardly inclined cutting edges for the blades, enlargements on the points of the blades, of a pair of sharpening members mounted in the path of the blades, and guides adapted to be engaged by the enlargements on the points of the blades to guide the blades between the sharpeners.

20. In a machine for removing loops or float threads from a woven fabric the combination of a series of blades, an endless chain carrying the blades, drums mounted upon vertical spindles at opposite edges of the fabric to drive the chain continuously, upwardly inclined cutting edges for the blades, enlargements on the points of the blades, a roller having two different diameters mounted to present part of the fabric to the cutters when passing across in one direction, a roller having two different diameters mounted to present the other part of the fabric to the cutters when returning or passing in the opposite direction, a bar for supporting the fabric between the rollers, guides for the blades and the chain, adjustable bars pressing upon the fabric on each side of the blades at the cutting position, feed rollers for feeding the fabric forward continuously to the ripping blades, a sharpening device mounted in the path of the cutters, and means for holding the selvages of the fabric away from the ripping blades.

21. In a machine for removing loops or float threads from a woven fabric the combination of a series of blades, an endless chain carrying the blades, drums mounted upon vertical spindles at opposite edges of the fabric to drive the chain continuously, upwardly inclined cutting edges for the blades, enlargements on the points of the blades, a roller having two different diameters mounted to present part of the fabric to the cutters when passing across in one direction, a roller having two different diameters mounted to present the other part of the fabric to the cutters when returning or passing in the opposite direction, a bar for supporting the fabric between the rollers, guides for the blades and the chain, adjustable bars pressing upon the fabric on each side of the blades at the cutting position, feed rollers for feeding the fabric forward continuously to the ripping blades, a sharpening device mounted in the path of the cutters, means for holding the selvages of the fabric away from the ripping blades, rotatable beaters for beating up the loop threads after the loops have been ripped and rotary cutters for removing the loop threads.

In testimony whereof I have signed my name to this specification in the presence of two subscribing witnesses.

CHAS. WM. FULTON.

Witnesses:
 ROBERT THOMSON,
 CLAUDE GILLIES.